Figure 2:
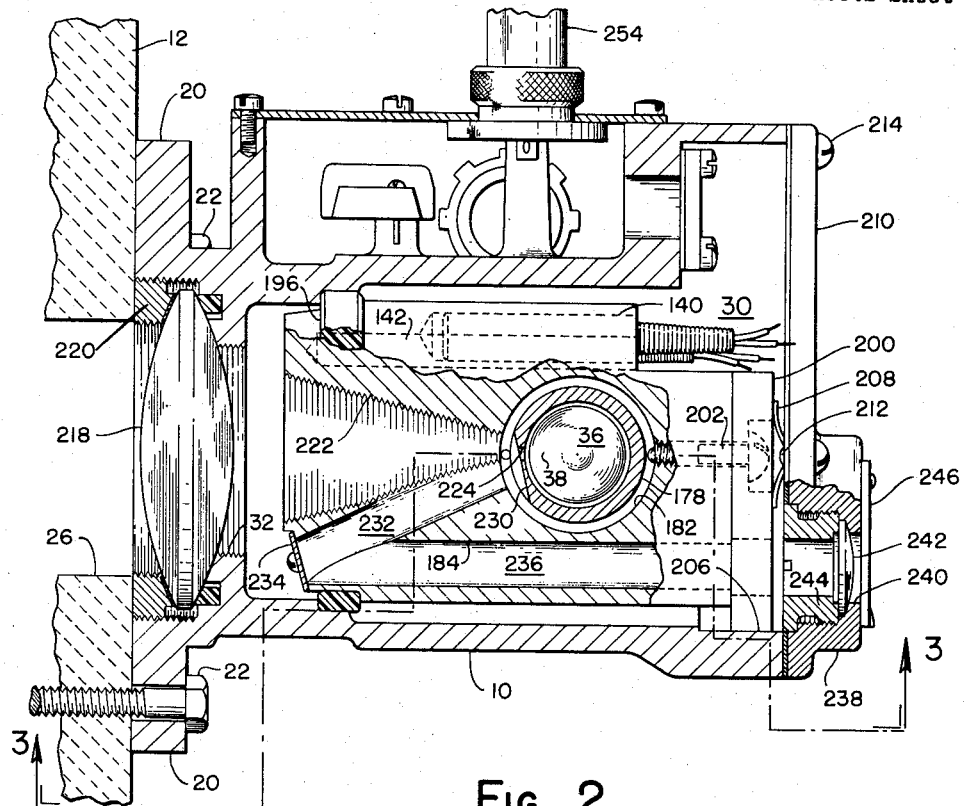

Jan. 15, 1963  J. F. ENGLISH, JR., ET AL  3,073,163
RADIATION BOLOMETER
Filed March 17, 1958  2 Sheets-Sheet 1
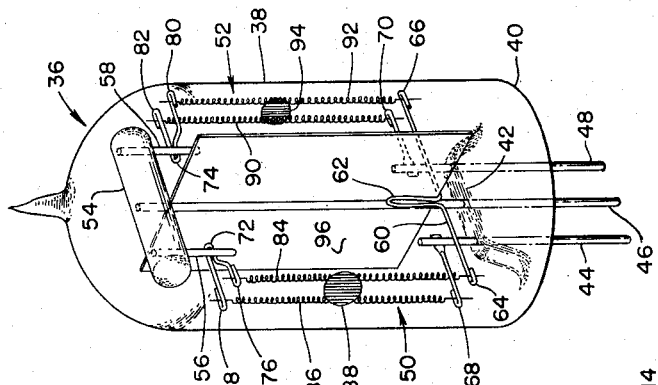
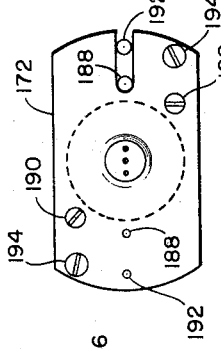
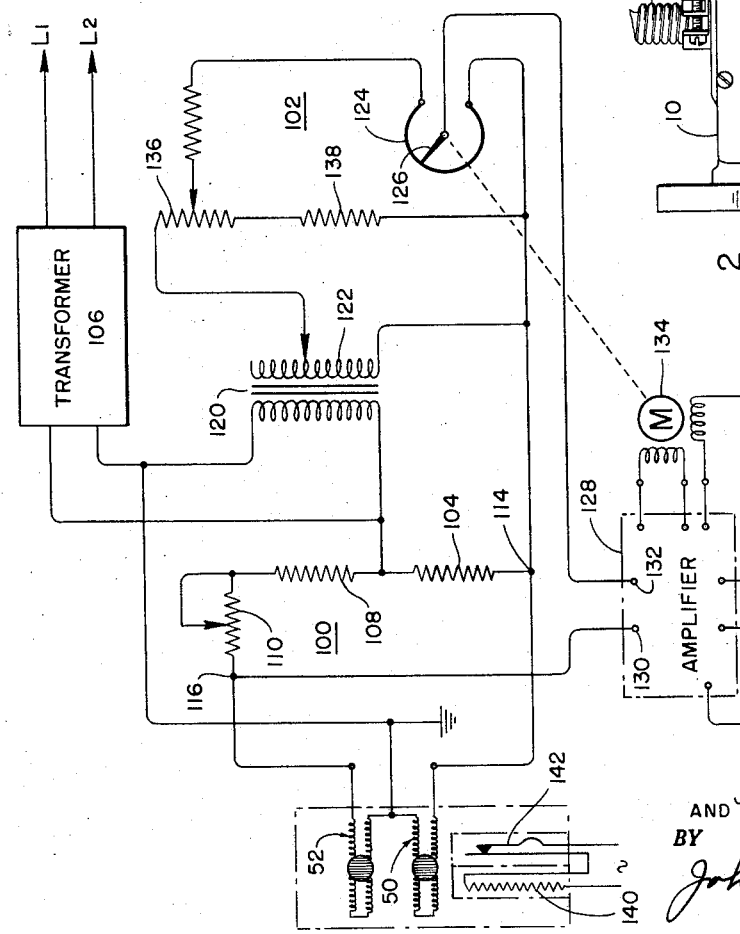
INVENTORS
JAMES F. ENGLISH JR.
AND ROBERT J. STEVENS
BY John F. Luhrs
ATTORNEY Jan. 15, 1963   J. F. ENGLISH, JR., ET AL   3,073,163
RADIATION BOLOMETER
Filed March 17, 1958   2 Sheets-Sheet 2

INVENTORS
JAMES F. ENGLISH JR.
AND ROBERT J. STEVENS
BY
ATTORNEY

United States Patent Office 3,073,163
Patented Jan. 15, 1963

3,073,163
RADIATION BOLOMETER
James F. English, Jr., Lakewood, and Robert J. Stevens, Mentor, Ohio, assignors to Bailey Meter Company, a corporation of Delaware
Filed Mar. 17, 1958, Ser. No. 721,869
10 Claims. (Cl. 73—355)

This invention relates to radiation responsive devices and more particularly to such a device having a radiation sensing element which forms a primary element of a measuring system.

Total radiation sensitive devices which employ an electrical resistance type of sensing element have been generally referred to as bolometers. The bolometer generally comprises a receiving element such as a filament having a resistance which changes with temperature and thus the level of radiation to which it is subjected. A second type of radiation sensitive device comprises a thermopile having a plurality of thermocouple elements connected in electric circuit to generate a voltage in the circuit in response to heating of the hot junctions of the thermocouple elements. As is well known to those skilled in the art, the thermopile will generate a direct voltage indicative of the temperature of the source of radiation.

The bolometer type has been found more desirable than the thermopile type in that the filament of the bolometer may be connected directly in an A.C. measuring circuit while the thermopile which produces a direct voltage must be connected in a D.C. circuit. The problems of D.C. amplification and stability obviously limit the use of such thermopile detectors.

The bolometer while desirable from the standpoint of the measuring circuit is subject to a number of factors which in the past have limited its use. One factor is that it is necessary to enclose the filament in an evacuated envelope in order to eliminate the heating and cooling effect of convective air currents and to prevent conduction of heat from the receiving element by the atmosphere surrounding it. This necessity of providing an evacuated structure has resulted in the bolometer being difficult to manufacture and of extremely large size to accommodate electrical resistance elements of sufficient size to produce the desired change of electrical resistance in response to a change in the level of radiation.

Since the filament must be enclosed by an evacuated structure, it is essential that the filament be of minimum size or a large bulky assembly will result. One known construction is to employ two straight wires intersecting at their medial portions to define an x type structure, which has a target supported at the intersection of the two wires for receiving the radiation. It has been found that the size of this structure necessary to accomplish a resistance change of sufficient magnitude to give positive indication of temperature results in a device which occupies a large amount of space and difficult to position in an evacuated enclosure.

Another important consideration to the use of a bolometer is the fact that the resistance of the tungsten filament will change with variations in ambient temperature and variations in the heating effect of the current in the measuring circuit. It will be apparent that a change in ambient temperature or bridge current will vary the initial temperature of the filament to thus introduce an error in the measuring circuit. To compensate for this effect, it is necessary to provide a compensating resistance which will undergo a resistance change in response to a change in ambient temperature or heating effect of the bridge current to balance out the change in resistance of the radiation sensitive resistance.

Even with the provision of a compensating resistance, however, it has been found that an error will result due to the difference in effect of these conditions on the two resistances when they are at different temperatures. For example, if the measuring resistance is at a high temperature due to radiation striking the same, a change in ambient temperature will have less effect on it than on the compensating resistance.

It is an object of this invention to provide a radiation sensitive measuring resistance which will occupy minimum space but will undergo a large change in electrical resistance in response to a change in the level of radiation.

Another object of the invention is to maintain a radiation responsive resistance and compensating resistance at a constant temperature to substantially eliminate the effect of ambient temperature and of current in the measuring circuit on the radiation measurement.

Another object of the invention is to maintain a measuring resistance and compensating resistance at a constant temperature higher than the ambient temperature normally encountered, and to insulate the resistance in a casing so that the wall of the casing is maintained at a lower temperature.

Another object of the invention is to provide an improved sighting means for aligning the measuring resistance with a source of radiation.

Another object of the invention is to provide a radiation bolometer of higher accuracy than prior devices.

In the preferred embodiment of the invention, a pair of resistance elements form a measuring resistance section each comprising a wire filament in the form of a helix. The measuring resistance elements are mounted in an evacuated glass envelope in parallel spaced relationship. A target is supported on the elements at the medial portions thereof. A second pair of resistance elements of identical construction to the first pair is positioned in the envelope on the opposite side of a shield from the first pair to form a compensating resistance section. Each pair of resistance elements is serially connected and forms one arm of a bridge circuit, the output of which is impressed on a potentiometer circuit.

The envelope is enclosed by a housing and mounted in a block of high heat absorbing capacity in insulated relationship therewith. The block is in turn supported within a casing in insulated relationship therewith. A lens is positioned within an opening in the casing and serves to focus radiation into a conical bore of the block to strike a flat polished surface of the housing. An opening in the housing permits a limited amount of radiation to strike the target of the measuring section.

A mirror serves to reflect light from the polished surface of the housing to a lens at one end of the casing where it may be viewed by the operator to align the opening in the housing with the radiation. The block is maintained at a substantially constant temperature higher than that of the ambient temperature by an electric heating element and thermostat.

Figure 3:
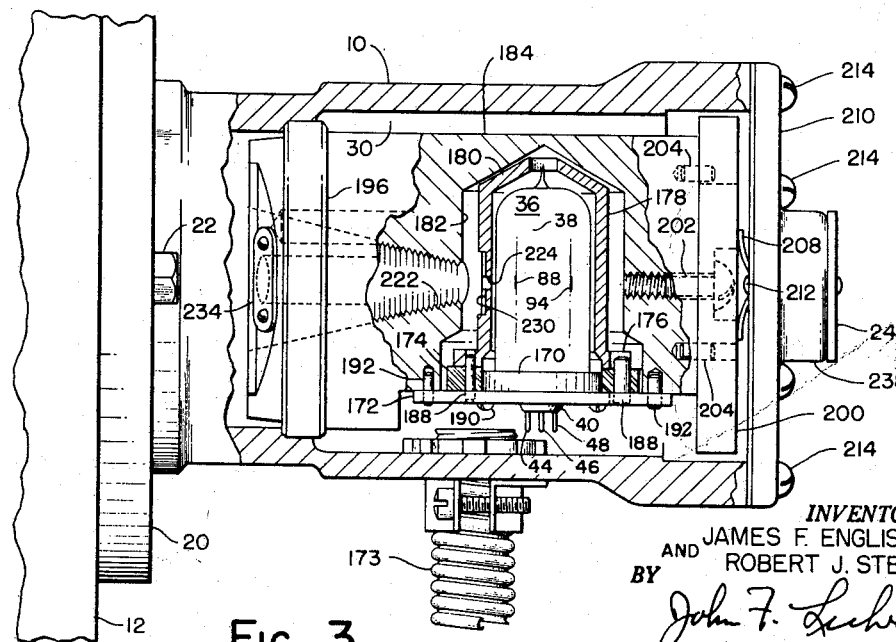

Other objects and advantages will become apparent from the following description taken in connection with the accompanying drawings wherein:

FIG. 1 is a side view of a radiation bolometer embodying this invention;
FIG. 2 is a section taken along the line 2—2 of FIG. 1;
FIG. 3 is a section taken along the line 3—3 of FIG. 2;
FIG. 4 is an enlarged perspective view of a portion of the bolometer;
FIG. 5 is a schematic illustration of the electrical circuit of the bolometer; and
FIG. 6 is an enlarged view of a detail.

Referring to FIGS. 1, 2 and 3, the radiation bolometer includes a casing 10, which houses a sensing unit generally indicated at 36 and which will be described more in detail hereinafter. The casing 10 as shown may be arranged to be supported on the wall 12 of a furnace (not shown) by means of a flange 20 and bolts 22. The wall 12 is provided with a suitable aperture 26 in axial alignment with a corresponding aperture 32 in the casing 10 so that the sensing unit 36 may receive radiation from the interior of the furnace.

Within the chamber 30 is mounted the sensing unit 36 on which the radiation from the furnace is focused. Referring now to FIG. 4, the sensing unit 36 comprises a transparent envelope 38 made of suitable material such as glass or quartz similar to and in the same order of size as that employed in the well known miniature vacuum radio tubes. The envelope 38 is generally cylindrical in form having a diameter of approximately ¾ of an inch and includes the usual base 40 having a glass bead 42 in the central portion thereof through which three spaced parallel pins or electrodes 44, 46, 48 extend. The portion of the pins 44, 46, 48 exterior of the envelope 38 are adapted to be connected to an electric circuit while the internal portions of the pins 44, 46, 48 provide support for the resistance elements and associated parts now to be described.

Still referring to FIG. 4, the envelope 38 contains two resistance sections indicated generally by the reference numerals 50, 52. As will become apparent, the resistance section 50 which will be referred to a a measuring resistance section comprises a first pair of helical resistance elements and is subjected to the radiation from the furnace 12. On the other hand, the resistance 52 comprises a second pair of helical resistance elements and is shielded from the furnace radiation to compensate for variations in resistance of the measuring section 50 as a result of the heating thereof by the flow of current therethrough.

Referring now in detail to the construction of the internal parts of the envelope 38, the pin 46 has its upper end terminating adjacent the upper end of the envelope 38. An elongated glass bead 54 is supported by said upper end of the pin 46 at its medial portion and has two pins 56, 58 extending downwardly from the ends thereof respectively in alignment with the pins 44, 48. The adjacent ends of the pins 44, 56 and of the pins 58, 48 are spaced as illustrated in FIG. 4.

A conducting element 60 has a looped medial portion 62 fixed to the pin 46 adjacent the lower end of the envelope 38 to define oppositely disposed supporting arms 64, 66 extending from said medial portion. The conducting element 60 is attached to the pin 46 by welding at the medial portion 62. The pins 44, 48 are provided with a pair of oppositely disposed supporting arms 68, 70 respectively which are mounted in spaced parallel relationship with the arms 64, 66. The upper pins 56, 58 are provided with a pair of supporting elements 72, 74 respectively which each comprise a generally U shaped member welded to its associated pin. Arms 76, 78 of element 72 extend from the pin 56 in alignment with arms 64, 68. Similarly, arms 80, 82 of element 74 extend from pin 58 in alignment with arms 66, 70.

Referring now to the construction of the measuring resistance section 50, a resistance element 84 is connected to the arms 64, 76, the ends of the arms 64, 76 being pinched to the ends of the element 84 to fix the same thereto. A second identical element 86 is connected similarly between the arms 68, 78. A circular member 88 of insulating material having a black surface is supported at the medial portions of both of the elements 84, 86, to define a target to receive radiation. When the sensing element 36 is mounted within the casing 10 as illustrated in FIGS. 2 and 3, radiation received through the opening 32 is directed toward the envelope 38. It will be apparent that this radiation will be directed toward the resistance section 50 perpendicular to the plane formed by the resistance elements 84, 86.

The resistance section 52 is identical to that of section 50 having a resistance element 90 connected between the supporting arms 70, 82 and a second resistance element 92 connected between the supporting arms 66, 80. A target 94 is supported at the medial portion of the resistance elements 90, 92.

Positioned between the resistance sections 50 and 52 is a shield member 96 which comprises a thin plate having a reflecting surface absorbing a minimum amount of radiation. As mentioned above, when the sensing element 36 is positioned within the casing 10 radiation is directed toward the envelope 38 in a direction perpendicular to the plane of resistance elements 84 and 86. The shield 96 is positioned parallel to the plane defined by the resistance elements 84, 86 and therefore is also perpendicular to the path of radiation directed to the envelope 38. Acocrdingly, any radiation passing beyond the resistance section 50 will strike the plate 96 and be reflected. With this arrangement the resistance section 52 is shielded from radiation entering the casing 10 and, therefore, is maintained at the temperature within the housing 178.

In one embodiment of our invention the resistance elements 84, 86, 90, 92 are each formed from tungsten wire having a diameter of .0004 inch. This wire is then wound on a mandrel having a diameter of .0025 inch and then stretched to separate the successive turns. When cold the resistance of each element is approximately 75 ohms. The tungsten wire employed has the inherent characteristics of undergoing a change in resistance with temperature. Accordingly, when the measuring resistance section 50 is subjected to an increase in radiation from the furnace, there will be a substantial increase in resistance in both the elements 84, 86. This resistance change is indicative of the temperature within the furnace. The targets 88, 94, are formed from mica coated with fused lead borate. The outer face of each target is coated with a colloidal graphite to produce a black, radiation absorbing surface.

Referring now to the circuit within the envelope 38 formed by the resistance elements 84, 86, 90, 92 and associated supporting arms and electrodes, it will be apparent that the two resistance elements of each section are connected in series. For example, a circuit is completed from pin 44 through supporting arm 68, resistance element 86, supporting arm 78, supporting arm 76, resistance element 84, and supporting arm 64 to pin 46. Accordingly, the effective electrical resistance of the measuring section 50 is the sum of the resistances of elements 84, 86, connected in series between the pins 44, 46. It will thus be apparent that a measure of the resistance between pins 44, 46 is an indication of the temperature within the furnace 12.

The compensating resistance section 52 forms an identical circuit which is completed from pin 48, through supporting arm 70, resistance element 90, supporting arm 80, supporting arm 82, resistance element 92, and supporting arm 66 to pin 46. Thus, the compensating section 52 forms a circuit identical to that of the section 50. The construction of the two sections 50, 52 is identical in all aspects. For example, while the resistance section 52 does not require a target in that it is not subjected to radiation, the target 94 is mounted on the section to maintain the structure identical in characteristics. The target 94 also makes the resistance sections 50, 52 reversible in function in that if it is so desired the resistance section 52 may be used as the measuring section and the section 50 employed as the compensating section.

Referring now to FIG. 5 the measuring circuitry consists essentially of a Wheatstone bridge, generally indicated by the reference 100, the unbalance of which is measured by a potentiometer circuit generally indicated by the reference 102. As shown, the measuring section 50 is connected in series with an impedance 104 across the source of potential comprising a constant voltage transformer 106. Similarly, the compensating wire 52 is connected in series with an impedance having a fixed section 108 and an adjustable section 110, across the potential source 106. Variations in the resistance of the measuring and compensating sections occasioned by changes in the temperature thereof cause corresponding changes in the potential from the point of connection 114 between the measuring wire 50 and impedance 124 to the point of connection 116 between the compensating wire 52 and the impedance having sections 108 and 110.

The adjustable section 110 is provided to afford a means for balancing the bridge circuit at a desired "zero" position. This "zero" position may be normal ambient temperature when the temperatures of the wires 50 and 52 are the same, or it may be depressed or elevated temperature from normal ambient in accordance with the range to be covered by the measuring device.

We have found that by making impedances 108, 110 and 104, of relatively high value with respect to the resistance of the sections 50 and 52, the sensitivity of the Bridge, that is to say, the changes in potential between 114 and 116 is materially increased for a given change in resistance of the sections, due to the fact that the current flow to the arms of the Bridge remains substantially constant. In one working embodiment of our invention each of the sections 50, 52 will have, at a temperature of 75° F. a resistance value of approximately 150 ohms, whereas the impedance 104 and the total impedance of sections 108, 110, will each be approximately 1800 ohms.

The potentiometer circuit generally indicated 102 is energized by the transformer 106 through an isolating transformer 120 having an adjustable secondary 122, and includes a slidewire resistance 124 having a movable contact arm 126. An amplifier, shown in block form at 128 having input terminals 130 and 132 connected to contact arm 126 and point 116 respectively, causes a reversing motor 134 to be positioned to maintain the potential of contact arm 126 equal to that at point 116. As point 114 is connected to one end of the slidewire 124 it is apparent that the position of the reversing motor 134 or contact arm 126 becomes a measure of the potential difference between points 114 and 116 which as heretofore explained is a function of the resistance of the measuring wire 50.

While preferably transformer 106 is a constant voltage transformer to minimize effects due to self-heating of the sections 50 and 52, it will be noted that by having a common source for the bridge 100 and potentiometer 102 variations in supply voltage will cause no error in measurement.

The transformer 120 is provided with the adjustable secondary 122 so that the range of the potentiometer may be easily varied to adapt it to the range in potential difference across points 114, 116 found or expected in any particular application for a desired range in temperature of the measuring device. To provide a further fine adjustment of the potentiometer range an adjustable resistance 136 is provided which may be connected in series with a fixed resistance 138 across the secondary 122.

By providing a compensating section 52, having identical characteristics to the measuring section 50, and a source of constant voltage supply, all errors due to self-heating are eliminated as heretofore explained. Errors due to fluctuations in ambient temperature of the wires are also eliminated by maintaining them at the same constant temperature under all operating conditions. Thus as shown schematically in FIG. 5 we provide a heater 140 controlled by a thermostat 142 located within a block 184 housing the element 36 as will be described more in detail hereinafter. A connector 254 as shown in FIG. 2 may be provided for supplying power from a suitable source to the heating element.

Referring now to FIGS. 2 and 3, the tube 36 containing the resistance sections 50, 52 is received in a suitable socket 170 which is seated on a plate 172, shown in detail in FIG. 6. The socket 170 may be of any suitable form such as that employed for the reception of radio tubes to which electrical connections may be made through a conduit such as indicated at 173. The socket 170 is encircled by a heat insulating ring 174 which is engaged by a flange 176 formed on the end of a generally cylindrical housing 178 inclosing the tube 36 and terminating in an upper conical surface 180. The housing 178 is of high heat storage capacity and is received in a large complemental recess 182 formed transversely in a generally cylindrical block 184 supported in the chamber 30 of the casing 10.

The housing 178 is mounted on the plate 172 by means of pins 188 and screws 190 which serve to clamp the flange 176 and heat insulating ring 174 to the plate 172. The plate 172 is clamped to a flat surface formed on the underside of the block 184 by means of pins 192 and screws 194 to thereby support the assembly comprising the tube 36, socket 170, insulating ring 174 and housing 178 in the recess 182. It will be apparent from FIGS. 2 and 3 that when the tube 36 is thus supported it is insulated from the block 184 by the air space between the periphery of housing 178 and surface of recess 182 and by the insulator 174.

Referring now to the mounting of the block 184, this member is in turn supported in insulated relationship to the walls of casing 10. More particularly, the left end of the block 184 is provided with a reduced diameter portion on which a heat insulating ring 196 is fitted. The periphery of the ring 196 is received in an annular recess formed in the wall of the casing 10 to thereby support that end of the block 184 in spaced relationship with the wall of the chamber 30.

The other end of the block 184 has a flat disc shaped insulator 200 fixed thereto by a screw 202 and pins 204, the insulator 200 engaging the casing wall at 206. A spring 208 is mounted in compression between the insulator 200 and a cover plate 210 fixed to the end of the casing 10 for urging the block 184 into engagement with the insulator 196 to maintain axial alignment of the block in the casing 10. The spring 208 may be of any suitable type and is here shown as comprising a spider fixed at its medial portion to the cover 210 by a screw 212 and having a plurality of resilient fingers engaging the insulator 200.

The cover 210 is attached to the casing 10 by screws 214 which may be removed to permit removal of the block 184, tube 36 and associated parts.

It is to be noted that the block 184 is insulated from the walls of the casing 10 similar to the manner in which the tube 36 is insulated from the block 184. The insulators 196, 200 effectively prevent contact of the block 184 with the casing 10 thus inhibiting conduction of heat therebetween while the block is insulated over its length by the substantial air space between its surface and the wall of the casing 10.

To direct radiation to the measuring resistance sections within the tube 36, a lens 218 is mounted in engagement with a shoulder of the opening 32 by means of a bushing 220 threaded within the opening 32. The block 184 is provided with a conical bore 222 in axial alignment with the lens 218. The bore 222 opens into the recess 182 in axial alignment with an opening 224 extending through the wall of the housing 178, the target 88 of the resistance section 50 being aligned with the opening 224 for receiving radiation passing therethrough. Thus, radiation from the furnace 12 is directed into the bore 222 and opening 224 by the lens 218 and is focused on the target 88 of the resistance section 50. The conical bore 222 is provided with a serrated surface which is effective to break up any stray radiation which is received.

The housing 178 is provided with a flat surface 230 surrounding the opening 24 which is highly polished to reflect radiation into a passage 232 within the block 184. A mirror 234 encloses the other end of the passage 232 and serves to reflect the light through a second passage 236 extending longitudinally through the block 184 and insulator 200. A cup shaped enclosure 238 is formed in the cover plate 210 and has an opening 240 in the bottom wall thereof in alignment with the passage 236. A sighting lens 242 is secured within the enclosure 238 by a bushing 244. A pivotal cover plate 246 is provided for covering the opening 240 when the lens 242 is not in use. The surface 230, passages 232, 236, mirror 234 and lens 242 provide a sighting means for the operator to align the opening 224 with the source of radiation.

Referring now to the particular results achieved by the invention, it is to be noted that the particular mounting and structure of the resistance sections 50, 52 results in a highly sensitive measuring device which occupies minimum space by employing two helical resistance coils positioned in physical parallel relationship. The resistance elements may be electrically connected in series to obtain a maximum change in resistance and at the same time utilized as support for a radiation absorbing target. The construction thus results in a measuring device which will undergo sufficient resistance change in response to a change in radiation to provide a positive temperature indication but yet small enough to be enclosed by a glass envelope of the size utilized for miniature vacuum radio tubes.

Accuracy of the radiation measurement is insured by the provision of the identical compensating resistance section 52 and maintaining a constant ambient temperature around tube 36. The resistance section 52 in addition to providing the compensation hereinbefore discussed, may be utilized as a measuring section if the tube 36 is rotated 180° from the position illustrated in FIG. 3. Thus, the two sections 50, 52 are completely interchangeable in function.

It is now desired to point out that the particular features of the block 184 and casing 10. The tube 36 and housing 178 are insulated from the block 184 by the air space surrounding the housing 178 and by the insulator 174. Due to the differential inherent in most thermostatic control systems it is very difficult to maintain the block 184 at an exact temperature. The insulation of the housing 178 and tube 36 and also the high heat storage capacity of the housing 178 serves to eliminate any direct conduction of heat between the block 184 and housing 178 to thereby prevent any temporary or cyclical temperature changes of the block 184 from affecting the temperature of the tube 36. The temperature at which the block 184 is maintained is dependent on and must be greater than the temperature exteriorly of the casing 10. To maintain the outer surface of the casing 10 at a relatively cool temperature, the block 184 is insulated by the air space between its surface and the casing 10 and by the insulators 196, 200. With this structure the casing 10 is maintained at a lower temperature so that the operator can easily service the device without deenergizing the heating element 140.

It will be apparent that the radiation bolometer embodying this invention has numerous advantages over prior art devices and differs substantially therefrom. It will also be apparent to those skilled in the art that many changes may be made in the construction and arrangement of parts without departing from the scope of the invention as defined in the appending claims.

What we claim as new and desire to secure by Letters Patent of the United States is:

1. A radiation responsive device comprising a small evacuated glass envelope of tubular configuration closed by a base at one end thereof, a first pair of wire resistance elements each wound in the form of a helix positioned in said envelope in spaced parallel relationship, a target of insulating material supported by said first pair of resistance elements at the medial portions thereof, a second pair of resistance elements identical to said first pair positioned in said envelope in spaced parallel relationship, a shield interposed between said pairs of resistance elements for shielding said second pair from the radiation directed to said envelope, and three spaced electrically conductive pins extending through said base within said envelope to provide support for said resistance elements and said shield, said resistance elements being electrically connected in series across two of said pins, the junction of said pairs being connected to said third pin.

2. A radiation responsive device for measuring the temperature of a furnace comprising a casing adapted to be supported on the wall of the furnace and having an opening in one end thereof adapted for alignment with an opening in the wall of the furnace, a lens positioned in said casing opening for focusing radiation within said casing, a supporting block totally enclosed within said casing having a high heat storage capacity, means for supporting said block in heat insulated relationship with the walls of said casing, a radiation sensitive device positioned within said block comprising a small tubular evacuated glass envelope having a thermally responsive resistance element mounted therein, a housing closely fitted over said envelope, means for supporting said radiation sensitive device and said housing therefor in heat insulated relationship within said block, an electric heating element positioned in said block, a thermostat responsive to the temperature condition of said block for controlling said heating element to maintain the temperature of said block substantially constant, and aligned openings in said block and housing respectively to subject said radiation sensitive device to the radiation focused by said lens.

3. A radiation responsive device as claimed in claim 2 wherein said block is spaced from the wall of said casing to define an air insulating space and said supporting means for said block comprise a pair of members formed from heat insulating material.

4. A radiation responsive device for measuring the temperature within a furnace comprising a casing adapted to be supported on the wall of the furnace and having an opening in one end thereof adapted for alignment with an opening in the wall of the furnace, a lens positioned in said casing opening for focusing radiation within said casing, a supporting block mounted completely within said casing having a high heat storage capacity, said block having a conical bore therein aligned with said casing opening, a pair of insulating elements supporting said block in spaced relationship with the wall of said casing, a hollow cylindrical housing fitted in a recess in said block and having an opening in the wall thereof aligned with said bore in said block, and a radiation sensitive device positioned within said housing adapted to be heated by radiation passing through said opening in said housing.

5. A radiation responsive device as claimed in claim 4 wherein a heating element is positioned in said block for heating the same, and a thermostat is provided for controlling said heating element in response to temperature variations of said block to maintain said block at a substantially constant temperature.

6. A radiation responsive device comprising, a small glass envelope of tubular configuration closed by a base at one end thereof, a first pair of wire resistance elements positioned in said envelope in spaced parallel relationship, a target of insulating material supported by said first pair of resistance elements at the medial portions thereof, a second pair of resistance elements identical to said first pair positioned in said envelope in spaced parallel relationship, a shield interposed between said pairs of resistance elements for shielding said second pair from the radiation directed to said envelope, and a plurality of electrically conductive pins extending through said base to provide support for said resistance elements and said shield and to provide for electrical connection of said resistance elements to an external circuit.

7. A radiation responsive device comprising a small evacuated glass envelope of tubular configuration closed by a base at one end thereof, a first pair of wire resistance elements each wound in the form of a helix positioned in said envelope in spaced parallel relationship, a target of insulating material supported by said first pair of resistance elements at the medial portions thereof, a second pair of resistance elements identical to said first pair positioned in said envelope in spaced parallel relationship, a shield interposed between said pairs of resistance elements for shielding said second pair from the radiation directed to said envelope, and a plurality of electrically conductive pins extending through said base within said envelope to provide support for said resistance elements and said shield and to provide for connection of said resistance elements to an external circuit.

8. A radiation responsive device for measuring the temperature of a furnace comprising, a casing adapted to be supported on the wall of the furnace and having an opening in one end thereof adapted for alignment with an opening in the wall of the furnace, a lens positioned in said casing opening for focusing radiation within said casing, a supporting block within said casing having a high heat storage capacity, a pair of insulating elements supporting said block in spaced relationship with the wall of said casing to establish an air insulating space between said casing and said block, a radiation sensitive device positioned within said block comprising an evacuated glass envelope having a thermally responsive resistance element mounted therein, a housing closely fitted over said envelope, a flange formed on one end of said housing, an insulating ring positioned between said flange and said block, means clamping said flange and said insulating ring to said block to support said radiation sensitive device and said housing therefor in heat insulated relationship within said block, an electric heating element positioned in said block, a thermostat responsive to the temperature condition of said block for controlling said heating element to maintain the temperature of said block substantially constant, and aligned openings in said block and housing respectively to subject said radiation sensitive device to the radiation focused by said lens.

9. A radiation responsive device for measuring the temperature within a furnace comprising, a casing adapted to be supported on the wall of the furnace and having an opening in one end thereof adapted for alignment with an opening in the wall of the furnace, a lens positioned in said casing opening for focusing radiation within said casing, a supporting block within said casing and having a high heat storage capacity, said block having a conical bore therein aligned with said casing opening, a pair of insulating elements supporting said block in spaced relationship with the wall of said casing, a hollow cylindrical housing fitted in a recess in said block and having an opening in the wall thereof aligned with said bore in said block, a radiation sensitive device positioned within said housing adapted to be heated by radiation passing through said opening in said housing, a heating element positioned within said block for heating the same, a thermostat responsive to the temperature of said block for controlling said heating element to maintain said block at a substantially constant temperature, a first passage extending into said block, a second passage in said block intersecting with said first passage and extending to the end of said casing opposite from the furnace, a mirror positioned at the intersection of said passages to reflect light through said second passage to the end of said casing, and a polished surface surrounding said opening in said housing for reflecting light into said first passage of said block to said mirror.

10. A radiation responsive device for measuring the temperature within a furnace, comprising, a casing adapted to be supported in the wall of the furnace and having an opening in one end thereof adapted for alignment with an opening in the wall of the furnace, a lens positioned in said casing opening for focusing radiation within said casing, a supporting block mounted completely within said casing and having a high storage capacity, said block having an opening therein aligned with said casing opening, a hollow housing positioned in a recess in said block and having an opening in the wall thereof aligned with the opening in said block, an insulating element supporting said housing in spaced relationship with the wall of said recess, and a pair of insulating elements supporting said block in spaced relationship with the wall of said casing.

References Cited in the file of this patent

UNITED STATES PATENTS

| | | |
|---|---|---|
| 1,553,789 | Moeller | Sept. 15, 1925 |
| 1,639,411 | Mechau | Aug. 16, 1927 |
| 1,788,849 | Schunemann | Jan. 13, 1931 |
| 1,804,344 | Jones | May 5, 1931 |
| 2,083,317 | Dallenbach | June 8, 1937 |
| 2,085,508 | Neubert | June 29, 1937 |
| 2,113,450 | Lasky et al. | Apr. 5, 1938 |
| 2,524,478 | Rutherford et al. | Oct. 3, 1950 |
| 2,678,233 | McCabe | May 11, 1954 |
| 2,779,811 | Picciano et al. | Jan. 29, 1957 |
| 2,811,856 | Harrison | Nov. 5, 1957 |
| 2,813,203 | Machler | Nov. 12, 1957 |
| 2,855,492 | English | Oct. 7, 1958 |